April 29, 1969 A. L. STOECKEL 3,441,190
IMPACT WELDING APPARATUS
Filed May 9, 1967 Sheet 3 of 11
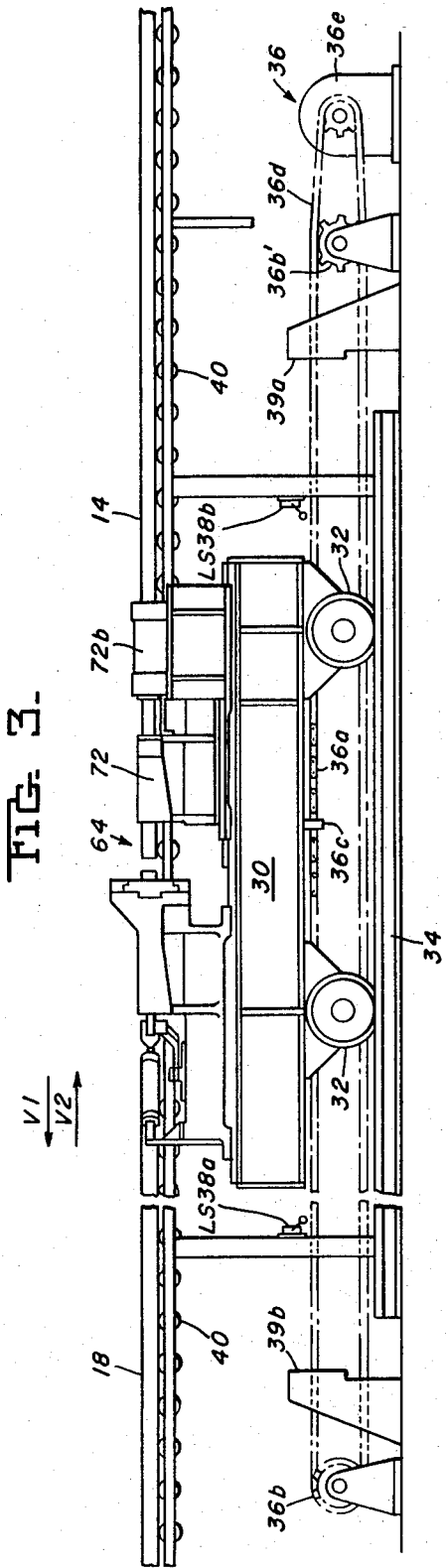
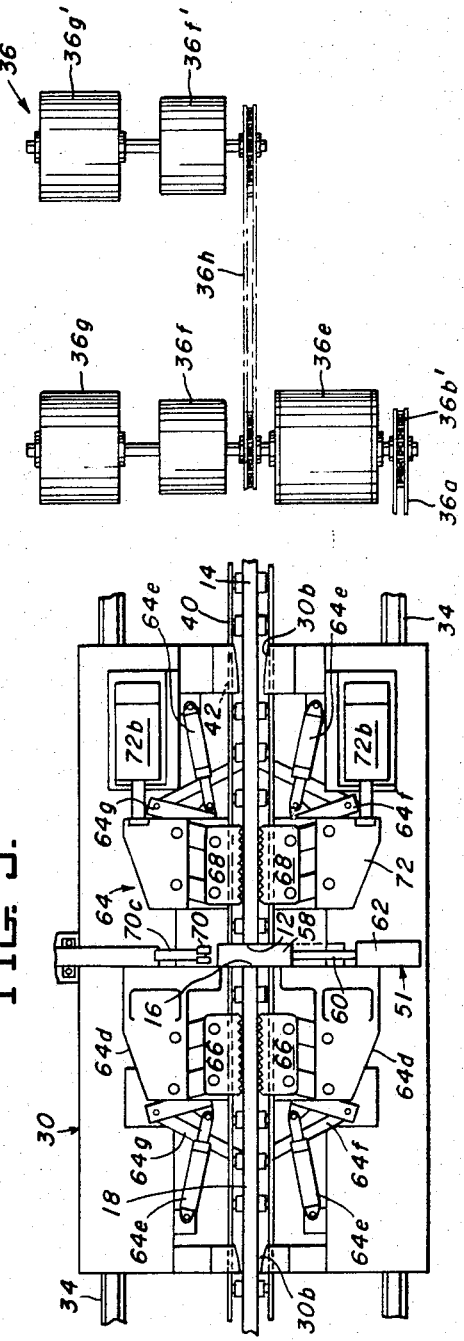
INVENTOR.
ALBERT L. STOECKEL
By Donald G. Dalton
Attorney

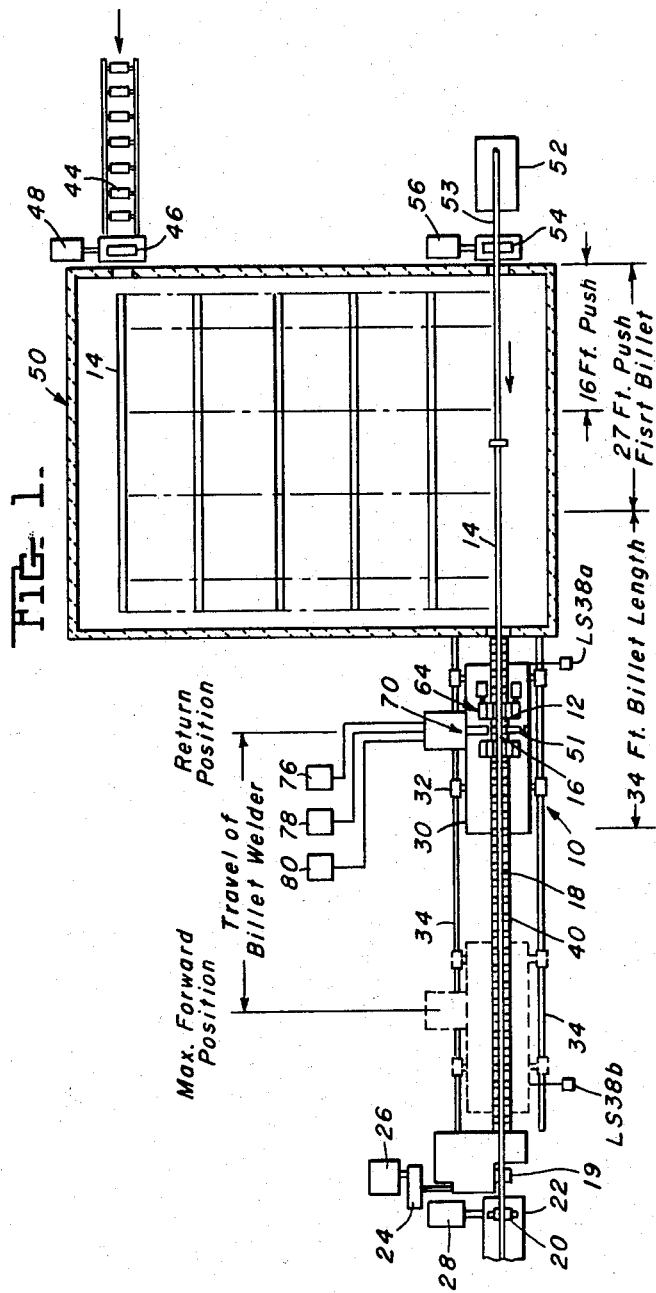

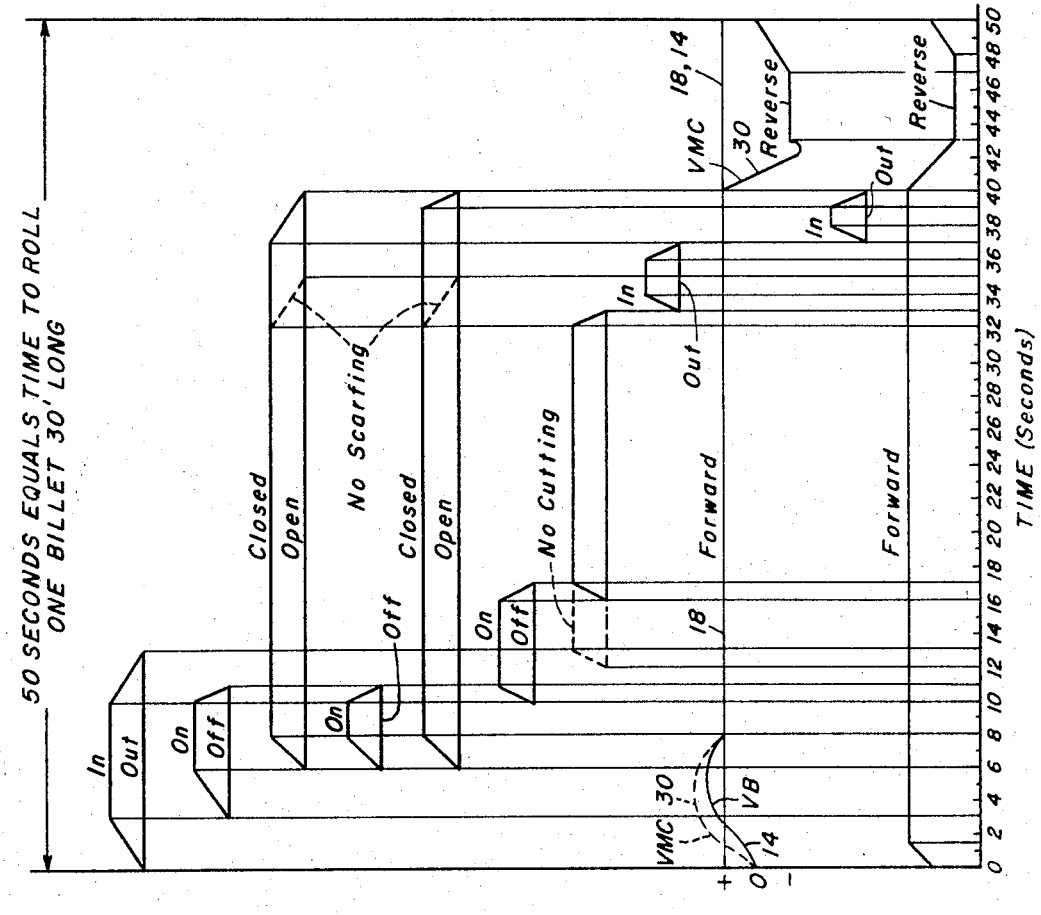

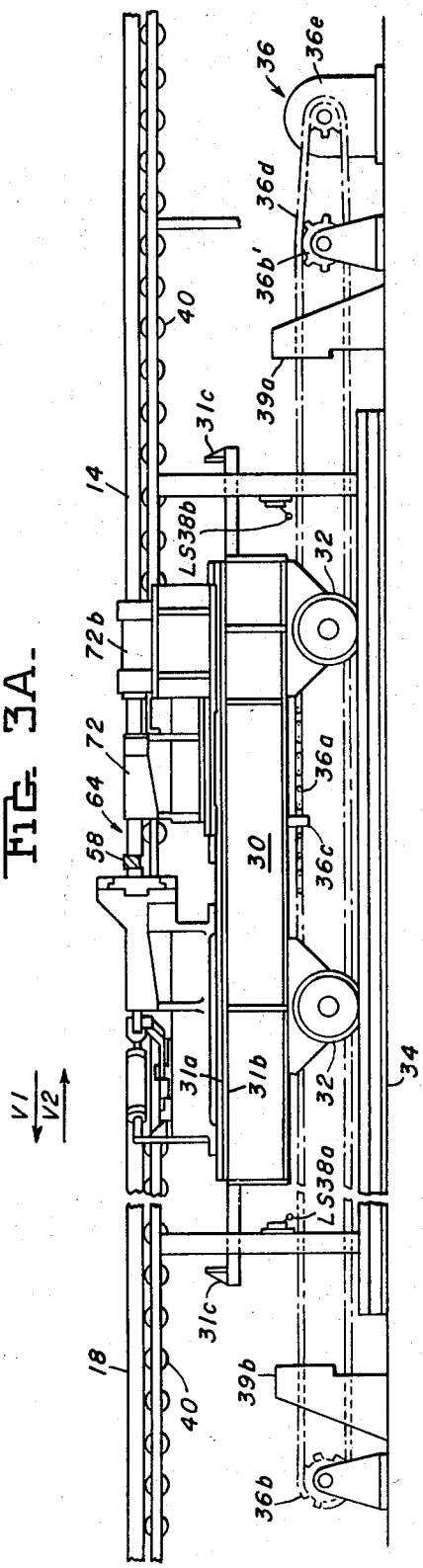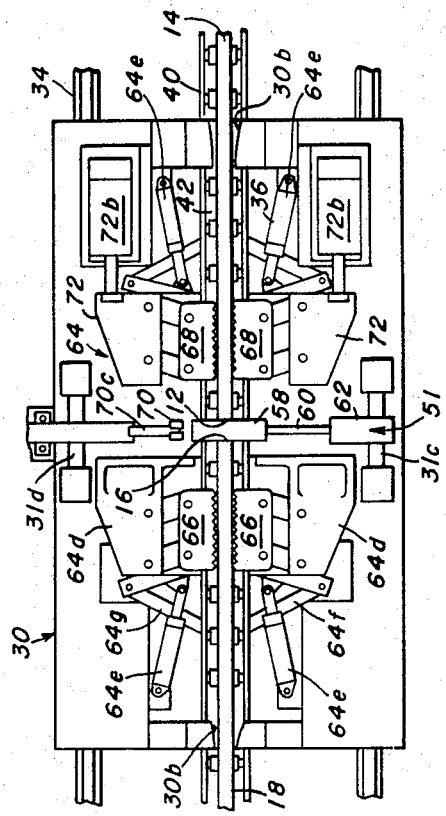

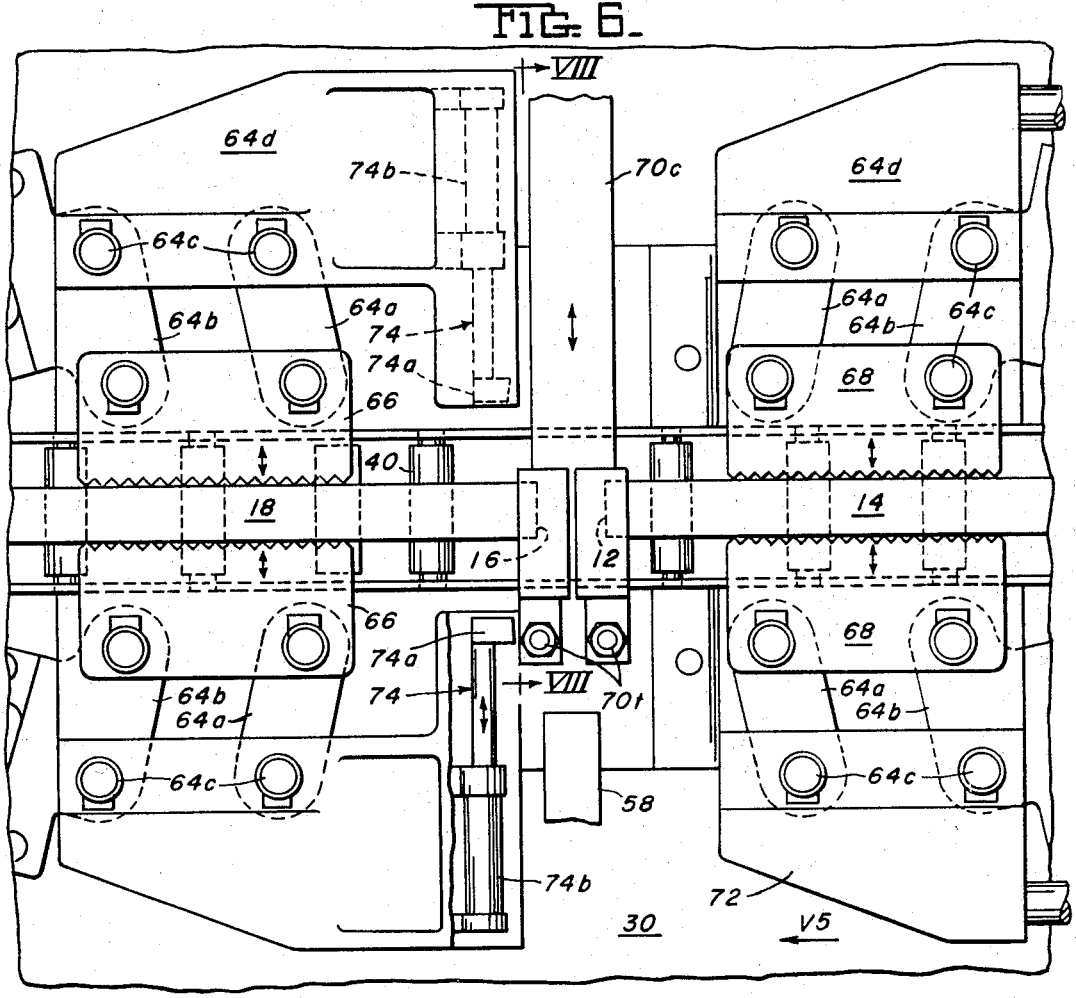
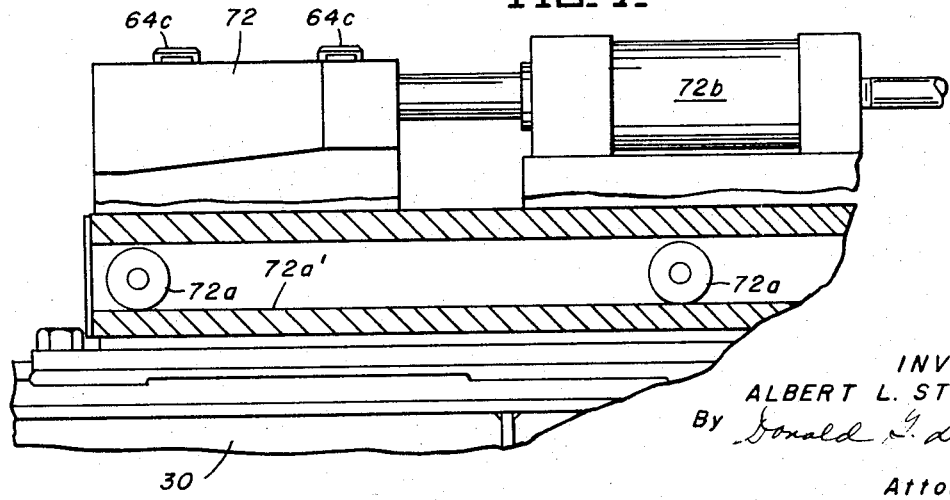

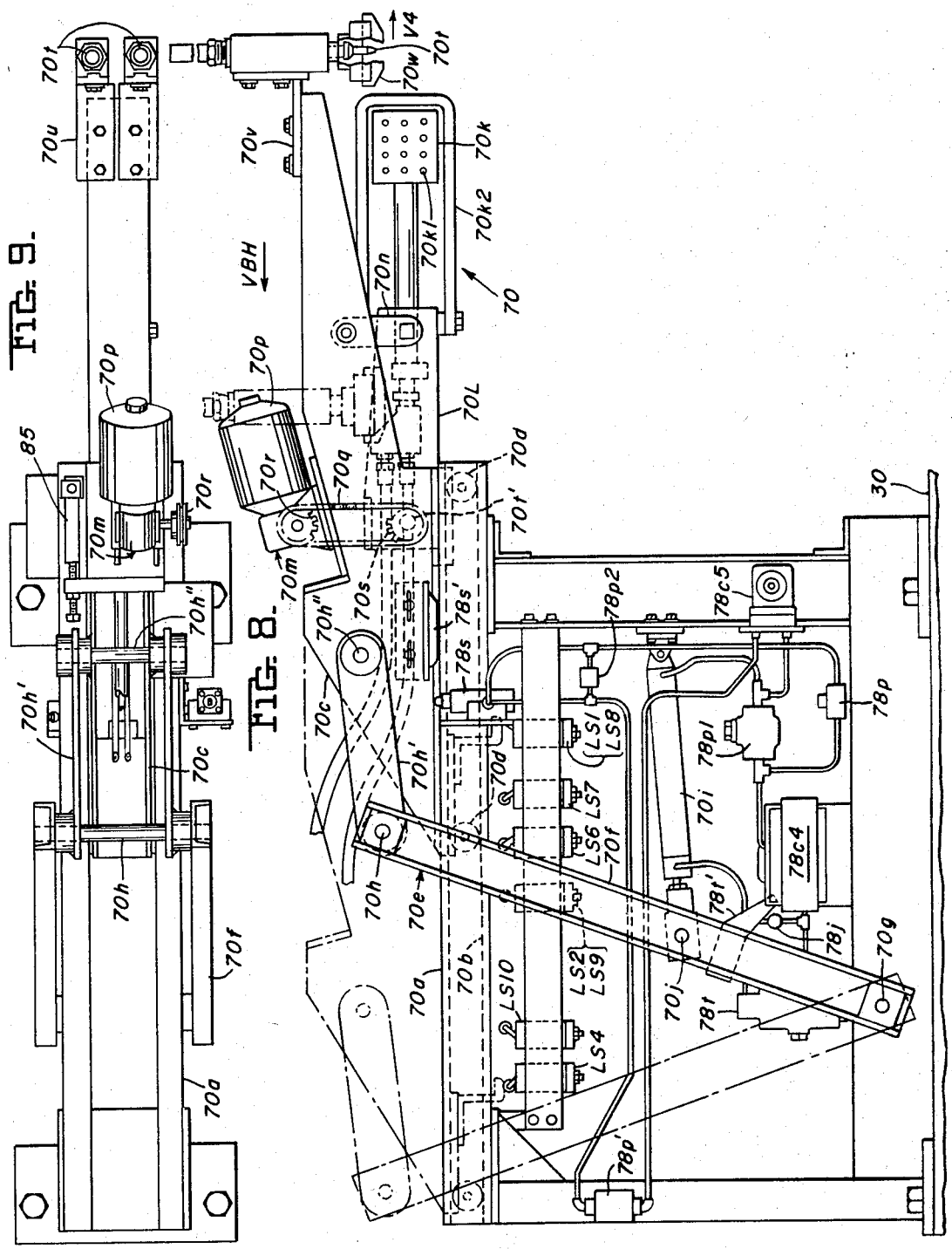

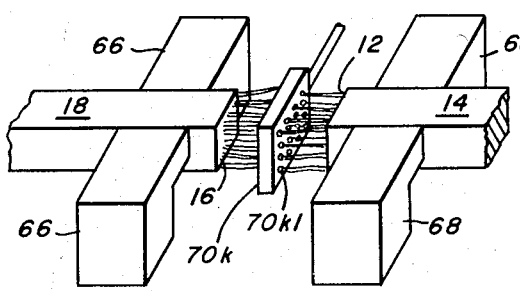
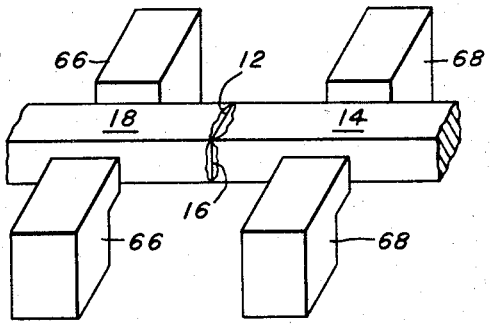
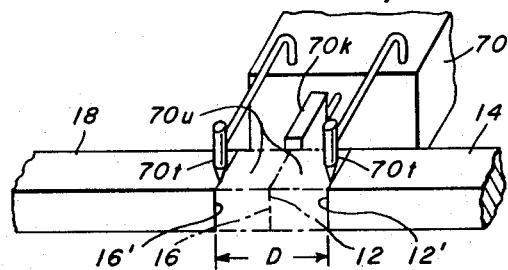
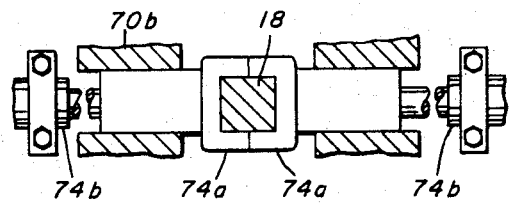
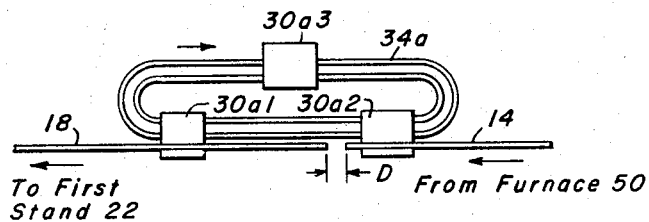
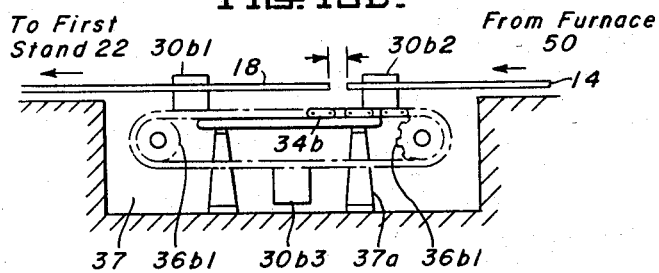

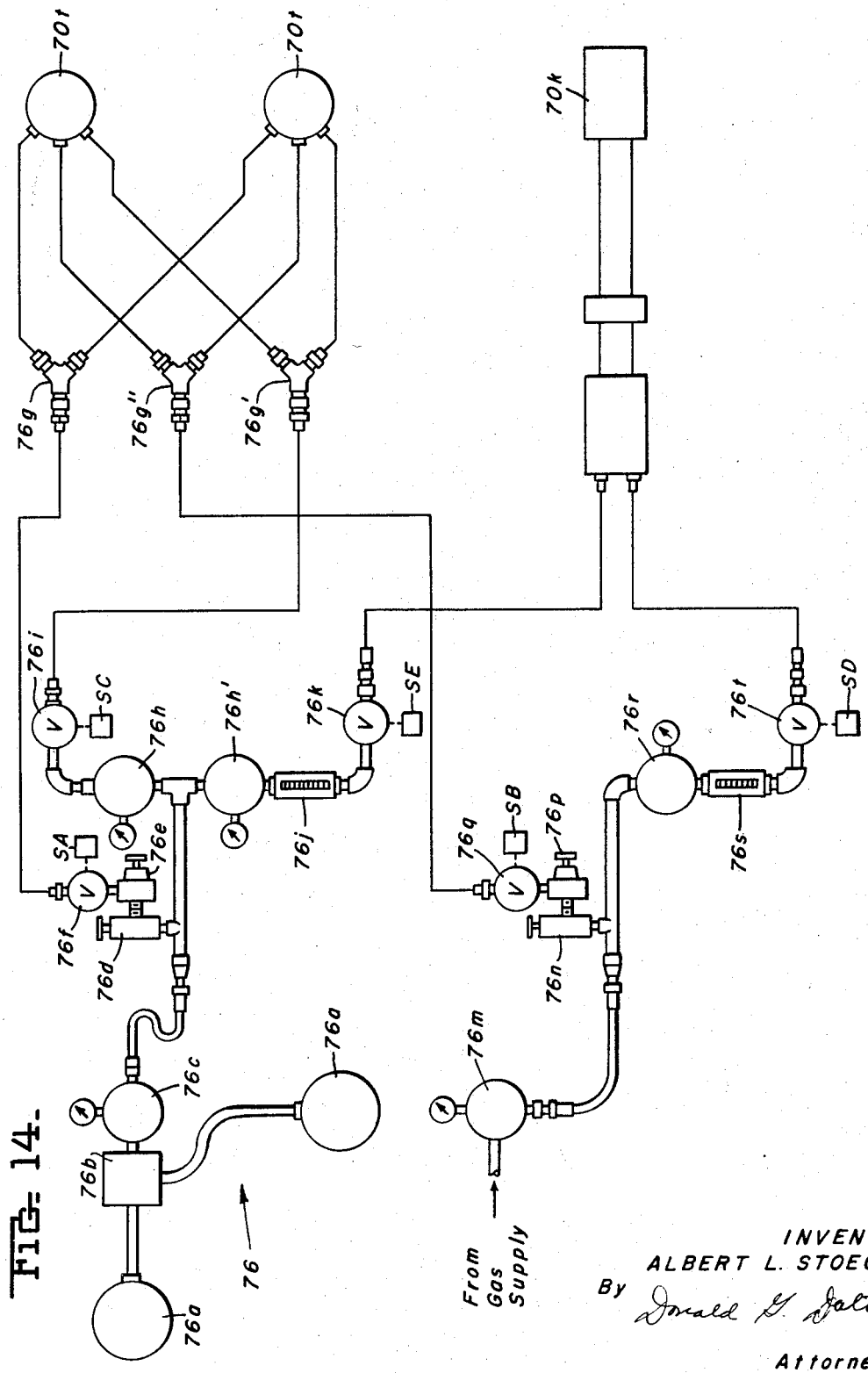

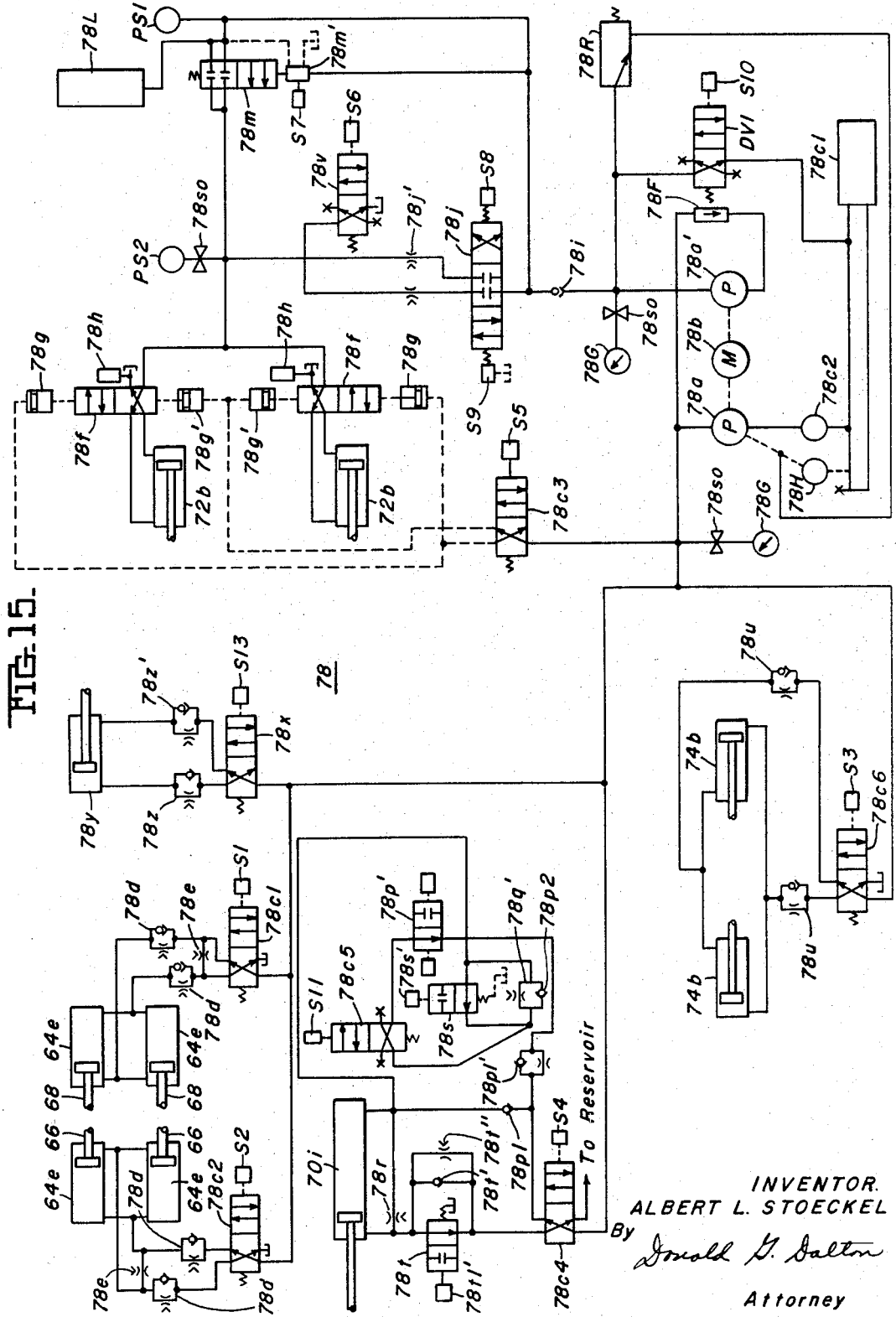

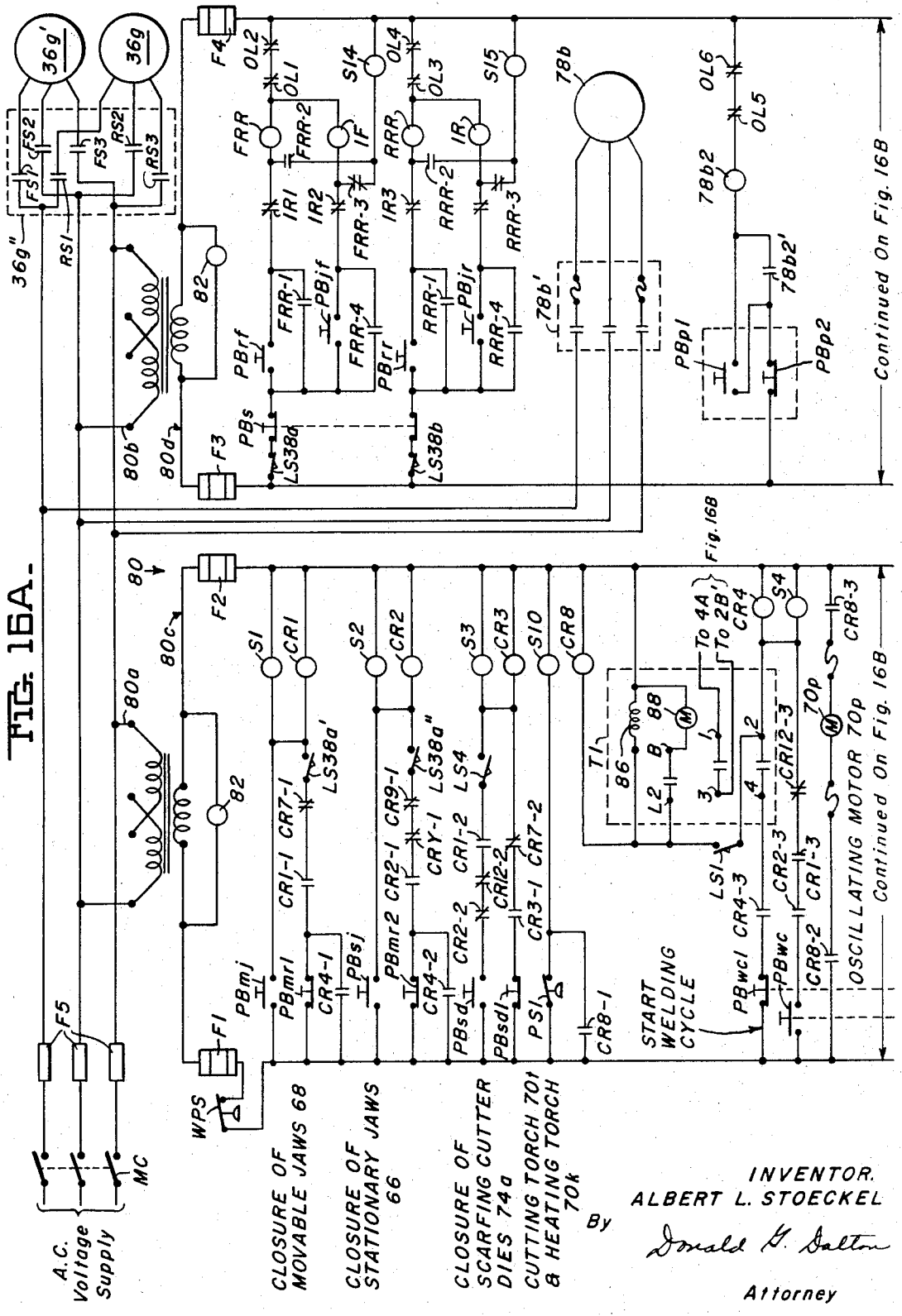

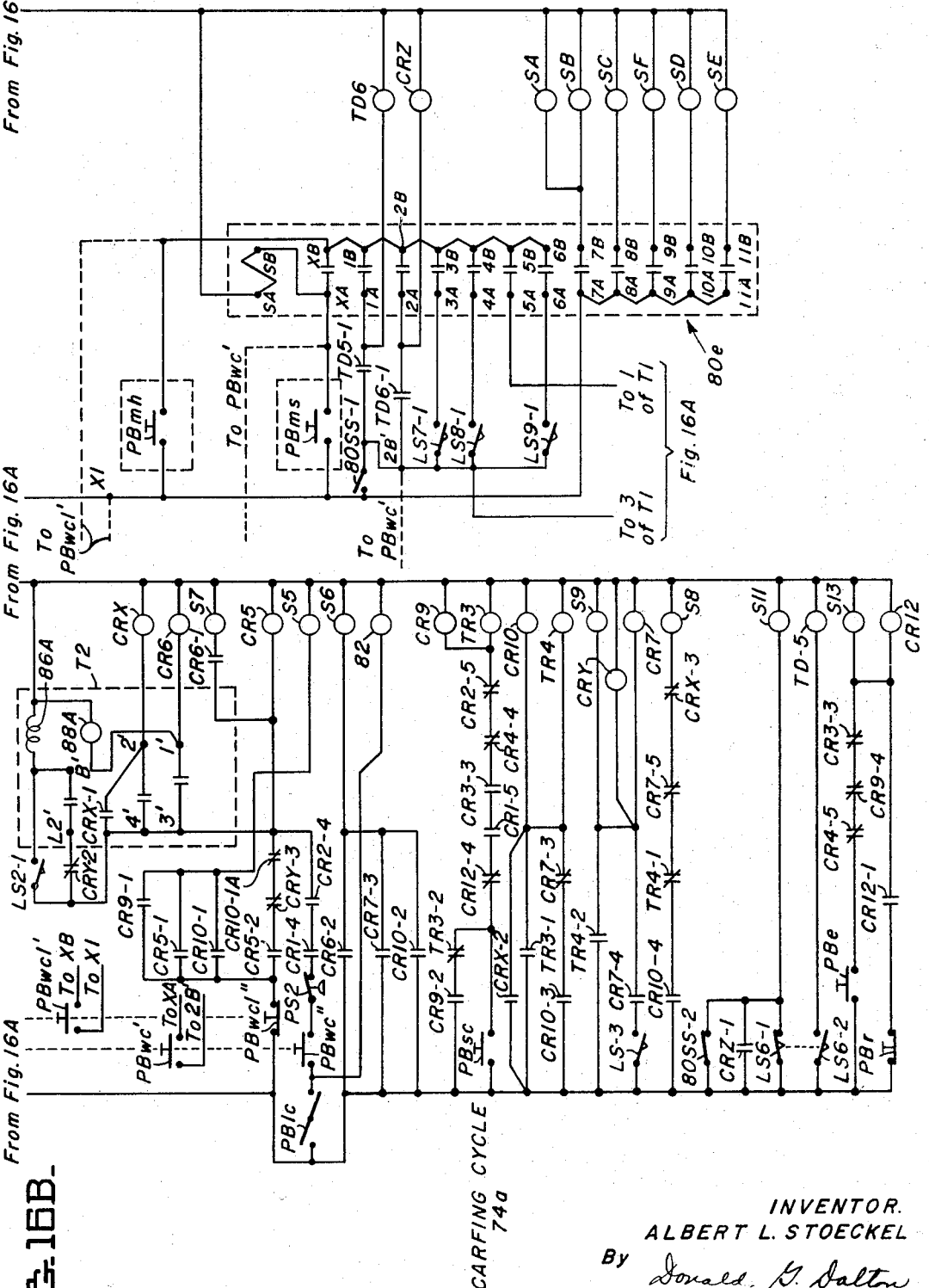

United States Patent Office 3,441,190
Patented Apr. 29, 1969

3,441,190
IMPACT WELDING APPARATUS
Albert L. Stoeckel, Euclid, Ohio, assignor to United States Steel Corporation, a corporation of Delaware
Filed May 9, 1967, Ser. No. 637,257
Int. Cl. B23k 1/20, 9/22, 19/00
U.S. Cl. 228—5      11 Claims

ABSTRACT OF THE DISCLOSURE

This invention relates to apparatus for impact welding one end of a billet to a continuous billet while such continuous billet is being processed and including a movable carriage having a billet spacing mechanism, a billet heating mechanism and a billet clamping and impacting mechanism.

Background of the invention

Heretofore, in a single line or in a multiple line rolling mill, billets have been fed end to end through the mill. Production losses occur due to cobbles, i.e. failure of the leading end of a billet to properly enter a mill stand and due to the space between the billets as such billets progress through the rolling mill. In the case of multiple line mills, loss of a billet in one of the lines produces off-size rolled finished products in the other lines, which products do not meet specified tolerances. When the end of a billet passes through a mill stand, loss of the stretch reduction tension between successive mill stands occurs thereby resulting in an overfill of the roll pass and requiring attendant trimming of the trailing end of the finished rolled product.

Conventional welding apparatus for rolling mills is shown in the following patents: 444,855, Earies, Jan. 20, 1891; 972,928, Schneider, Oct. 18, 1910; 1,736,428, Bryant, Nov. 19, 1929; 1,899,991, Smith, Mar. 7, 1933; 1,901,514, Herman et al., Mar. 14, 1933; 1,968,442, Clark et al., July 31, 1934; 2,015,184, Hopkins, Sept. 24, 1934; 2,261,837, Allen, Nov. 4, 1941; 2,303,557, Jones, Dec. 1, 1942; 2,525,862, Carpenter et al., Oct. 17, 1950; 2,623,-973, Malke, Dec. 30, 1952; 2,627,009, Carson et al., Jan. 27, 1953; 2,729,879, Sampson, Jan. 10, 1956; 2,737,140, Totten, Mar. 6, 1956; 2,842,349, Ipsen, July 8, 1958; 2,848,206, Kniveton, Aug. 19, 1958; 2,911,516, Cox, Nov. 3, 1959; 783,225, British, Sept. 18, 1957.

Objects of the invention

It is the general object of this invention to avoid and overcome the foregoing and other difficulties of and objections to prior art practices by the provision of apparatus for impact welding a billet to a continuous billet, which apparatus:

(a) Substantially increases rolling mill production by eliminating lost production due to the space between the billets.

(b) Produces rolled finished product with more uniform dimensions and minimizes the chance for out-of-size tolerances, (c) Substantially eliminates cobbling and resultant product loss, and (d) Substantially eliminates the loss of stretch reduction tension between mill stands and resultant overfill of the roll pass and attendant trimming of defective end portions from the finished rolled product.

Brief summary of the invention

The aforesaid objects of this invention, and other objects which will become apparent as the description proceeds, are achieved by providing apparatus for impact welding an end of a billet to an adjacent end of a continuous billet while the continuous billet is being processed through a first work station. The apparatus has a movable carriage operable between a billet receiving position and the first work station at a variable first velocity initially greater than the velocity of the continuous billet as such continuous billet moves through the first work station. The movable carriage is operable between the first work station and the billet receiving position at a second velocity greater than the first velocity. A billet spacing mechanism on the movable carriage is adapted to engage the adjacent end of the continuous billet while the movable carriage is moving toward the first work station. A billet feeding (positioning) mechanism adjacent the billet receiving position positions the end of the billet against the billet spacing mechanism, thus disposing the end of the billet at a predetermined distance from the adjacent end of the continuous billet. A billet clamping and impacting mechanism on the movable carriage has a pair of stationary jaws adapted to grip or clamp the adjacent end of the continuous billet and a pair of movable jaws adapted to grip or clamp the end of the billet when the end of the billet is spaced the predetermined distance from the adjacent end of the continuous billet, so that the movable carriage moves with the continuous billet. The billet spacing mechanism is then operable to retract away from the gripped adjacent ends of the continuous billet and the end of the billet to be welded. A heating mechanism on the movable carriage is movable transversely between the gripped adjacent ends of the continuous billet and the end of the billet to be welded for heating the adjacent ends of the continuous billet and of the billet to a temperature slightly below the melting temperature of the billet metal. The movable jaws are operable longitudinally to impact the heated end of the billet to be welded against the heated adjacent ends of the continuous billet, thus causing welding together of the ends of the two billets.

The invention also includes the combinations for the impact welding apparatus of:

(a) The movable carriage and the billet spacing mechanism, (b) The movable carriage and the billet feeding (positioning) mechanism, (c) The movable carriage and the billet clamping and impacting mechanism, (d) The movable carriage and the heating mechanism, (e) The impact welding apparatus without the billet spacing mechanism, and (f) A stationary impact welding apparatus for test purposes.

*Brief description of the several views of the drawings*

For a better understanding of this invention reference should be had to the accompanying drawings, wherein like numerals of reference indicate similar parts throughout the several views and wherein:

FIGURE 1 is a plan diagrammatic view of the impact welding apparatus of this invention;

FIGURE 2 is a typical billet weld time cycle of the operating elements of the impact welding apparatus;

FIGURE 3 is a broken side elevational view of the movable carriage, its drive means and the billet conveyor;

FIGURE 3A is a view similar to FIGURE 3 of an alternative embodiment showing an upper frame of the movable carriage slidable on the frame of the movable carriage;

FIGURE 4 is a fragmentary plan view of the power means for the drive means for the movable carriage;

FIGURE 5 is a fragmentary plan view of the billet conveyor, movable carriage and billet spacing mechanism and showing the continuous billet and a billet positioned against the spacer;

FIGURE 5A is a view similar to FIGURE 5 of an alternative embodiment showing the billet heating mechanism and the billet spacing mechanism slidable together on the frame of the movable carriage;

FIGURE 6 is a plan view of the movable carriage showing the billet clamping and impacting mechanism, billet heating mechanism and billet weld scarfing mechanism;

FIGURE 7 is a fragmentary side elevational view of the impacting mechanism shown in FIGURE 6;

FIGURE 8 is a side elevational view of the billet heating mechanism taken along the line VIII—VIII of FIGURE 6 in the direction of the arrows;

FIGURE 9 is a plan view of the billet heating mechanism shown in FIGURE 8;

FIGURES 10A–10B are fragmentary perspective views diagrammatically showing the heating and welding operations;

FIGURE 11 is a fragmentary vertical sectional view of the scarfing dies in the closed position about the welded continuous billet;

FIGURE 12 is a view similar to FIGURES 10A–10B of the billet cutting operation;

FIGURE 13A is a diagrammatic plan view of an alternative embodiment of the movable carriage;

FIGURE 13B is a diagrammatic side elevational view of another alternative embodiment of the movable carriage;

FIGURE 14 is a schematic diagram of the gas and oxygen control means for the impact welding apparatus;

FIGURE 15 is a schematic diagram of the hydraulic control means for the impact welding apparatus;

FIGURES 16A–16B are wiring diagrams of the electrical control means for the impact welding apparatus; and FIGURE 17 is a view in elevation of a control station showing the push buttons for manual override control of the impact welding apparatus.

Although the principles of this invention are broadly applicable to impact welding, this invention is particularly adapted for use in conjunction with the impact welding of an end of a billet to an adjacent end of a continuous billet being processed in a rolling mill and hence it has been so illustrated and will be so described.

*Detailed description*

With specific reference to the form of this invention illustrated in the drawings, and referring particularly to FIGURE 1, an impact welding apparatus is indicated generally by the reference numeral 10.

This impact welding apparatus 10 impact welds one end 12 of a billet 14 to an adjacent end 16 of a continuous billet 18 while the continuous billet 18 is being processed in a first work station, for example fed by drag rolls 19 to and rolled by rolls 20 of a first roll stand 22. The drag rolls 19 are driven by a reduction gear mechanism 24 and a motor 26. A motor 28 drives the rolls 20.

The apparatus 10 has a movable carriage 30 (FIGURES 1, 3) mounted on wheels 32, which wheels 32 are driven on a track 34 by a drive means 36 (FIGURES 1, 3, 4) between a billet receiving position, the solid line position in FIGURE 1, and the first work station or the first roll stand 22, the dotted line position shown in FIGURE 1, during the time T1–½—T37 (to the left, FIGURE 2), at a variable first or forward velocity V1 initially greater than the velocity Vcb of the continuous billet 18 as it moves through the first stand 22. The movable carriage 30 is automatically reversible during time T37–T40, as hereinafter explained, by a reversing switch LS38b FIGURES 3, 16) adjacent bumpers 39b. The movable carriage 30 is then movable at a second or reverse velocity V2 about six times greater than the forward velocity V1 of the movable carriage 30 during the time T35—T48–½ (to the right, FIGURE 2), between the first stand 22 and the billet receiving position of the movable carriage 30 where the movable carriage 30 is again reversed automatically by the reversing switch LS38a (FIGURES 2, 16) adjacent bumper 39a, as hereinafter explained.

As shown in FIGURES 1, 5, the continuous billet 18 is supported between the billet receiving position and the first stand 22 by a roller conveyor 40 disposed below a slot 42 (FIGURE 5) in the movable carriage 30. The carriage 30 is provided with guides 30b for the billets 18, 14.

Referring to the right-hand portion of FIGURE 1, cold billets 1 are fed by a conveyor 44 through pinch rolls 46 (driven by a motor 48) into a billet reheating furnace 50 where such billets 14 are heated to a temperature of about 2200° F. Such heated billets 14 are discharged from the billet heating furnace 50 by a billet feeding (positioning) mechanism 52 and onto the conveyor 40 when the movable carriage 30 is adjacent the billet receiving position, the solid line position shown in FIGURE 1, and against an extended spacer 58 of a billet spacer mechanism 51 mounted on the movable carriage 30 at time T8 (FIGURE 2). In order to power the billet feeding mechanism 52, pinch rolls 54 (FIGURE 1), driven by a motor 56, engage a push-out bar 53 and move the push-out bar 53 and heated billet 14 at variable velocity Vb (FIGURE 3) greater than the velocity V1 of the movable carriage 30, thus enabling the billet 14 to catch up to the billet spacing mechanism 51 at time T8 (FIGURE 2).

The billet spacer 58 attached to the billet spacing mechanism 51 (FIGURES 1, 5) is actuated by piston 60 of a double-acting hydraulic cylinder 62 (FIGURE 5) operatable transverse to the direction of travel of the movable carriage 30 and in line with the billet heating mechanism 70 (FIGURES 7, 8, 9). As the end 16 of the continuous billet 18 contacts the billet spacer 58 stationary clamping jaws 66 are closed and grip the end 16 of the continuous billet at time T6 (FIGURE 2). The drive means 36 for the movable carriage 30 is then declutched at the time T6 and the movable carriage 30 rides with the continuous billet 18 during the time T6—T37 (FIGURE 2).

As the end of the heated billet 14 is delivered onto the conveyor 40 by the push-out mechanism 52 and as the movable carriage 30 moves toward the first stand 22, the end 12 of the billet 14 is positioned against the other side of the billet spacer 58. When the end 12 of the billet 14 engages the billet spacer 58 at the time T8 (FIGURE 2), the pair of movable jaws 68 of the billet clamping and impacting mechanism 64 clamp the end 12 of the heated billet 14, thereby clamping the adjacent end 16 of the continuous billet 18 and the end 12 of the heated billet 14 the predetermined distance D (FIGURE 12) apart. The billet spacer 58 of the billet spacing mechanism 51 is then retracted away from between the gripped ends 16 and 12 at a time T10—T11 (FIGURE 2).

As the movable carriage 30 continues its path toward the first stand 22, a heating mechanism 70 (FIGURES 6, 7) mounted on the movable carriage 30 moves into the space D between the ends 16, 12 during the time T12—T13 (FIGURE 2) to heat the ends 16, 12 during the time T13—T32 to a temperature slightly below the melting temperature of the billet 14 and continuous billet 18, for example about 2800° F.

The movable jaws 68 are then operable during the time T34—T36 to impact the heated end 12 of the billet 14 into the heated adjacent end 16 of the continuous billet 18, thereby welding and holding the ends 16, 12 together and adding the billet 14 to the continuous billet 18 being rolled through the first stand 12. Thereafter the cycle is repeated.

Having described generally the operation of the improved welding apparatus 10 of this invention, it is deemed desirable to consider the details of the above-mentioned mechanisms.

Drive means for movable carriage 30

The drive means 36 (FIGURES 3, 4) for the movable carriage 30 has an endless chain 36a supported by sprockets 36b and connected to the movable carriage 30 at 36c (FIGURE 3). The right-hand sprocket 36b' as viewed in FIGURE 4 is driven through a gear reduction unit 36e, which gear reduction unit 36e (FIGURE 4) is connected through an electrically operated overrunning clutch 36f to a reverse drive motor 36g operable to retract the movable carriage 30 to the right, as viewed in FIGURE 1, at the velocity V2. In order to drive the movable carriage 30 forward to the left (FIGURE 1) at a velocity $$V1 = \frac{1}{6}V2$$

a chain drive 36h, connects the gear reduction unit 36e to a second electric overrunning clutch 36f' and to a forward drive motor 36g'. Referring to FIGURE 1, the movable carriage 30 is driven by the drive means 36 from the billet receiving position toward the first stand 22 during the time T1-½—T10, rides in the same direction with the continuous billet 18 during the period T10—T32, and is reversed by the drive means during the period T37—T47, thereby returning the released movable carriage 30 to the billet receiving position. Alternatively the drive means 36 can be mounted on the movable carriage 30 and directly connected to the wheels 32.

Reversing mechanism for movable carriage

As shown in FIGURES 1 and 3, when the movable carriage 30 reaches the limit of its normal travel in either direction, the leading portions of the movable carriage 30 actuate limit switches LS38a, LS38b (FIGURES 3, 16A), disposed at the extreme limits of the safe travel of the movable carriage 30, to stop and reverse the drive 36.

Billet spacing mechanism 51

Referring to FIGURE 5, the billet spacing mechanism 51 has the double-acting cylinder 62 mounted on the movable carriage 30 in line with the billet torch carriage 70c (FIGURES 5, 8, 9). Between the time T0—T3 FIGURE 2) the spacer 58 moves from the retracted or dotted line position shown in FIGURE 5 to the forward or solid line position shown in such FIGURE 5. During the period T3—T10 (FIGURE 2) the spacer 58 remains in the forward position. The continuous billet 18 engages the spacer 58 at the time T6 (FIGURE 2) and billet 14 engages the spacer 58 at time T8 (FIGURE 2) and remain in contact with the spacer 58 until time T10 (FIGURE 2). The spacer 58 is retracted during the time T10—T13 (FIGURE 2) just prior to the start of the welding cycle.

Billet push-out or feeding or positioning mechanism 52

The push-out bar 53 (FIGURE 1) of the billet push-out mechanism 52 moves the heated billet 14 toward the spacer 58 at an accelerated velocity Vb during the time T0—T8 (FIGURE 2) to cause the billet to engage the spacer 58 at time T8.

Billet clamping and impacting mechanism 64

The stationary jaws 66 and the movable jaws 68 are reciprocable in the direction of the arrows (FIGURE 6) and are each pivotally mounted by double links 64a, 64b, the links 64a, 64b being pivoted at 64c on a bracket 64d. The movable jaws 68 are mounted on a movable jaw carriage 72 and are each pivotally mounted by similar double links 64a, 64b. Each pair of jaws 66, 68 is operated by a pair of hydraulic cylinders 64e (FIGURE 5) and is aligned by a pantograph linkage 64f, 64g. Referring to FIGURES 5, 6, the stationary jaws 66 and movable jaws 68 are closed about the continuous billet 18 and billet 14 respectively during the time T6–T8. The stationary jaws 66 remain closed during the period of time T6–T32 and are opened during the time T37–T40. During the closure of the stationary jaws 66 and the movable jaws 68 about the spaced continuous billet 18 and billet 14 respectively, the billet heating mechanism 70 heats the ends 16, 12 to desired temperature and at the end of a predetermined time T13–T32 is quickly retracted (T32–T33). Then the movable carriage 72 is moved forward on wheels 72a in guides 72a' (FIGURE 7) by impact cylinders 72b to weld the ends 16, 12 together and to hold such ends 16, 12 together during the time T34–T36 (FIGURE 2).

Billet heating mechanism 70

The billet heating mechanism 70 (FIGURES 8, 9) has a frame 70a for supporting guide tracks 70b on which a movable torch carriage 70c is reciprocable on wheels 70d by a drive means 70e between a retracted or dotted line position shown in FIGURE 8 and a heating or solid line position shown in FIGURE 8. The drive means 70e for the mechanism 70 (FIGURE 8) has a lever 70f pivoted on the frame 70a at 70g and is connected at 70h to links 70h' and to a hydraulic cylinder 70i at 70j. The links 70h' are connected to the carriage 70c at 70h''. This drive means 70e reciprocates the movable carriage 70c at a velocity Vbh (FIGURE 8) and in a timed cycle as determined by limit switches LS1–LS4 and LS6–LS10 (FIGURES 8, 16A, 16B), which limit switches LS1–LS4 and LS6–LS10 are disposed along the path of movement of the movable carriage 70c on the frame 70a. Such limit switches LS1–LS4, LS6–LS10 are in the electrical control means 80 shown in FIGURES 16A–16B.

To provide uniform heating of the faces or ends 16, 12 of the continuous billet 18 and billet 14 respectively, a double-faced torch 70k (FIGURES 8, 10A) having a plurality of burner holes 70k1 and a guard 70k2 is mounted on a bracket 70L on the right-hand portion (FIGURE 8) of the frame 70a and is oscillated by an oscillation mechanism 70m. The torch bracket 70L is resiliently mounted on the frame 70a by pivot links 70n. A motor 70p drives an endless chain 70q supported by sprockets 70r, 70s, which sprockets 70s drives an eccentric 70t' which causes the bracket 70L to oscillate, such that the torch holes 70k1 describe a circle and prevent uneven heating of the billet ends 12 and 16.

Alternative embodiments

It will be understood by those skilled in the art that the impacting of the spacer 58 against the end 16 of the continuous billet 18 can be minimized by sliding an upper frame 31a on a frame 31b of the movable carriage 30 as limited by stops 31c on the extremities of the slide 31b.

Alternatively as shown in FIGURE 5A, the billet heating mechanism 70 and the billet spacing mechanism 51 are slidable together on slides 31d, 31c respectively in transverse registry with each other.

Further, the upper frame 31a (FIGURE 3A) may be fixedly mounted for use of the apparatus 10 as a test station.

Alternatively the impact welding apparatus 10 may be provided with a scarfing mechanism 74 (FIGURES 6, 11).

Scarfing mechanism 74

The scarfing mechanism 74 has a pair of dies 74a (FIGURES 6, 11) which are reciprocable on guides 70b by hydraulic cylinders 74b. Referring to FIGURE 2, the scarfing dies 74a close about the continuous billet 18 during the time T37–T38 as shown in FIGURE 11, remains closed during the time T38–T39 and are opened during the time T39–T40. The reversing movement of the movable carriage 30 causes the closed scarfing dies 74a to remove the flash from the weld between the end 16 of the continuous billet 18 and the end 12 of the billet 14.

Cutting torches

As shown in FIGURES 8, 9, 12 the billet heating mechanism 70 can be provided with a cutting means, such as a pair of cutting torches 70t, to trim the end 16 of the continuous billet 18 and the end 12 of the billet 14 preparatory to heating. Alternatively as shown in FIGURE 12, when the ends 16, 12 are not square the billet spacing mechanism 51 can be inoperative and such ends 16, 12 butted together to permit such cutting torches 70t to cut two slugs 70u (FIGURE 12) having a width D. Thereafter the double-faced heating torch 70k heats the cut ends 16′, 12′ as before.

The cutting torches 70t are resiliently mounted on the bracket 70L (FIGURES 8, 9) at 70v and carry shoes 70w to prevent the torches 70t from hitting (and to permit the torches 70t to ride up over) the edges of the continuous billet 18 and the billet 14. Referring to FIGURE 2, the cutting torches 70t engage the edge of the continuous billet 18 and the billet 14 during the time T10–T11 and then preheat the edge of the billets 18, 14 to remove scale prior to starting to cut out the slugs 70u during the time T11–T16. The cutting torches 70t and the heating torch 70k are mounted in spaced relationship on the movable torch carriage 70c and are in transverse alignment with the billet spacer 58. In this case the heating torch 70k moves forward to heat the cut ends 16′, 12′ (FIGURE 12) during the time T17–T32 (FIGURE 2). Thereafter the movable torch carriage 70c quickly retracts prior to impacting, as heretofore described.

In FIGURE 13A the movable carriages 30a1, 30a2, 30a3 ride on a generally elliptical horizontal track 34a. In the position shown, the movable carriage 30a2 is accelerating to position the billet 14 either against or spaced from the continuous billet 18. FIGURE 13B shows a chain 34b disposed about sprockets 36b1 in a pit 37 and having the upper portions of the track 34b on a support 37a. The movable carriages 30b1, 30b2, 30b3 operate essentially as in FIGURE 13A.

The impact welding apparatus 10 has a gas and oxygen control means 76 (FIGURES 1, 14), a hydraulic control means 78 (FIGURES 1, 15) and an electrical control means 80 (FIGURES 1, 16A, 16B). For clarity of description the gas and oxygen control means 76, hydraulic control means 78 and electrical control means 80 will be described in conjunction with the scarfing mechanism 74 and cutting torches 70t.

Gas and oxygen control means 76

Preheat oxygen from oxygen supply tanks 76a (FIGURE 14) passes through an oxygen manifold 76b, an oxygen regulator 76c, oxygen valve 76d, oxygen regulator 76e, two-way solenoid operated valve 76f (operated by solenoid SA, FIGURES 14, 16B) and a Y-fitting 76g to one side of the cutting torches 70t for preheating before cutting. Cutting oxygen reaches the other side of the cutting torches 70t by a branch line extending through oxygen regulator 76h, two-way solenoid operated valve 76i (operated by solenoid SC), FIGURES 16A, 16B, and a Y-fitting 76g′. A third branch oxygen supply line extends through a third oxygen regulator 76h′, a flow rate meter 76j, a two-way solenoid operated valve 76k (operated by solenoid SE), FIGURES 16A, 16B, to supply the double-faced heating torch 70k.

Gas supply

The gas supply, suitably methane and indicated by the legend "from gas supply" (FIGURE 14), is in communication with a fuel gas regulator 76m, fuel gas valve 76n, fuel gas regulator 76p, two-way solenoid operated valve 76q (operated by solenoid SB), FIGURES 14, 16B, and thence to a Y-fitting 76g″ and the cutting torches 70t. A branch fuel line extends through a fuel regulator 76r, fuel flow meter 76s, two-way solenoid operated valve 76t (operated by solenoid SD), FIGURES 16A, 16B, to supply gas to the heating torch 70k.

Hydraulic control means 78

Two pumps 78a, 78a′ (FIGURE 15) driven by a motor 78b pump a fluid, such as oil, from a reservoir 78c1 through filter 78c2 to the operating lines. Pump 78a provides hydraulic power at about 1000 p.s.i. to operate all parts of the system except the impact and scarfing cycles which are supplied with oil by pump 78a′ at about 3000 p.s.i. Flow control valve 78F allows high pressure pump 78a′ to be super-charged from the low pressure pump 78a.

Jaw cylinders 64e

In order to operate the stationary jaws 66 (FIGURE 15) and the movable jaws 68, each pair of jaws 66, 68 is provided with a substantially similar hydraulic circuit. Considering, for example, the movable jaws 68, oil enters a two-position, spring offset four-way valve 78c1 (operated by solenoid S1). FIGURES 16A, 16B, 15, and flows through flow control valves 78d to opposite ends of the hydraulic cylinders 64e. A bypass valve 78e may be disposed between the branch lines to allow free circulation of warm oil to the system when it is not being operated.

Torch carriage cylinder 70i

Oil in this case flows from low pressure pump 78a through a two-position, four-way valve 78c4 (operated by solenoid S4, FIGURES 15, 16A, 16B) to a rapid advance control valve 78p (having check valve 78p1′), a two-way lever operated detent or manual blocking valve 78p′, a two-position two-way blocking 78c5 (operated by solenoid S11), FIGURES 15, 16A, 16B, a cutting speed control valve 78q′ (having check valve 78p2), to the cylinder 70i.

A roller cam operated spring return, normally open two-way blocking valve 78s′ is in parallel with the speed control valve 78q′. A similar two-way cam operated blocking valve 78t is disposed between the cylinder 70i and the valve 78c4.

At the start of the cutting and heating cycle at time T10 (FIGURE 2), the solenoid S4 (FIGURE 15) is energized to cause the hydraulic valve 78c4 to shift, which in turn causes hydraulic fluid to flow through the internal check valve 78t′ to cylinder 70i. The cylinder 70i moves the torch carriage 70c forward rapidly at velocity $V_{bh}$ until the cam valve 78s is closed by a cam shoe 78s' (FIGURE 8), thus causing the discharge oil from the head end (right end as viewed in FIGURE 15) of the cylinder 70i to be diverted through the speed control valve 78q'. Meanwhile the blocking valve 78c5 is closed (operated by solenoid S11), FIGURES 15, 16A, 16B, to cause the torch carriage 70c to stop momentarily with the billet cutting torches 70t on the edge of billets 18, 14 for the initial preheat prior to the start of the cutting cycle. At the end of the present time (about six seconds at time T23 (FIGURE 2)) blocking valve 78c5 is reenergized (operated by solenoid S11), FIGURES 15, 16A, 16B, to allow hydraulic oil to flow through the speed control valve 78q' and the torch carriage 70c moves at a preset cutting speed V4 (FIGURES 8, 12).

At the end of the cutting cycle at time T16 (FIGURE 2) the cam valve 78s (FIGURE 15) moves off the cam 78s' (FIGURE 8) and torch carriage 70c rapidly moves to the end of its stroke. The carriage 70c positions the billet preheating torch 70k between end faces 16, 12 of continuous billet 18 and billet 14 for the start of the weld preheat cycle, at time T17–T32. When the timer T1 (FIGURE 16A) times out the hydraulic valve 78c4 (operated by solenoid S4), FIGURES 15, 16A, 16B, is shifted to cause the carriage cylinder 70i to rapidly retract cam 78t' (attached to the torch carriage 70c), FIGURE 8. The cam 78t' operates cam valve 78t near the end of the return stroke (time T32–T33) to cause cam valve 78t to block the free flow of the hydraulic fluid and divert hydraulic fluid through the speed control valve 78t", thus cushioning the torch carriage 70c at the end of its stroke (time T32–T33).

Impacting cylinders 72b

Oil from the high pressure pump 78a' (FIGURE 15) flows through a check valve 78i to charge an accumulator 78L which accumulator 78L acts as a high pressure storage for the impact and scarfing cycles. A pressure switch PS1 (FIGURES 15, 16A, 16B) connected electrically to a dump valve DV1 (operated by solenoid S10), FIGURES 15, 16A, 16B, is deenergized to divert pump flow back to the tank 78c1 when the pressure switch PS1 reaches maximum set pressure, thus indicating that the accumulator 78L is fully charged. High pressure pump 78a' is unloaded until pressure drops in the accumulator 78L and pressure switch PS1 closes again.

Prior to actual impact at time T34 a main valve 78c3 (operated by solenoid S5), FIGURES 15, 16A, 16B, is shifted to provide hydraulic power to the pilot cylinders 78g, which cylinders 78g hydraulically operate four-way upset valves 78f which are pre-positioned for the upset cycle. At the end of the weld heating cycle at time T32 (FIGURE 2) (controlled by a timer T1), FIGURES 16A, 16B, an impact valve 78m is caused to open by a pilot valve 78m' (operated by solenoid S7), FIGURES 15, 16A, 16B, thus shifting large impact valve 78m and releasing the charge from the accumulator 78L through the upset valves 78f to each impact cylinder 72b. The movable jaw carriage 72 is propelled violently forward to cause the heated ends 16, 12 of continuous billet 18 and billet 14 respectively to be impacted. The upset ends 16, 12 are thus caused to be welded together at time T34. At the end of a preset time (about two seconds) timer T2 (FIGURE 16B) times out, thus causing the impact cylinders 72b to be retracted and the stationary jaws 66 to be automatically opened at time T35. The main valve solenoid S5 is deenergized (FIGURES 15, 16A, 16B) thus shifting the main valve 78c3 and the pilot cylinders 78g' and causing upset valves 78f to shift with resultant retraction of the upset cylinders 72b. Surge tanks 78h prevent build-up of excess back pressure during the impact cycle.

Scarfing cutter cylinders 74b

Oil from pump 78a (FIGURE 15) enters a two-position, four-way valve 78c6 (operated by solenoid S3) and flows through speed control valves 78u disposed in each branch line for the opposite ends of the hydraulic cylinders 74b, thereby bringing the scarfing (cutting) dies 74a (FIGURE 11) into operating position around the billets 18, 14 at time T38 (FIGURE 2). The movable jaws 68 remain closed through their associated circuitry. Stationary jaws 66 remain open for the scarfing cycle.

Operation of the scarfing cycle is initiated by opening of the main valve 78c3 (operated by solenoid S5), FIGURES 15, 16A, 16B, which valve 78c3 supplies hydraulic fluid to the pilot cylinders 78g, thus causing the upset valves 78f to shift into position for the forward travel of the movable jaw carriage 72. A main scarfing valve 78j, a three-position double solenoid blocked center valve, is shifted into scarf position by energizing solenoid S8 (FIGURES 15, 16A, 16B), thus supplying hydraulic fluid from the accumulator 78L through the speed control valves 78j' to cause the upset cylinders 72b to move the movable jaw carriage 72 forward at a slow velocity V5 (FIGURE 6), thus propelling the billet weld through the scarfing dies 74a and removing the excess weld upset metal. Main carriage 30 actually moves rearward relative to the billet 18 during the scarfing cycle.

At the completion of the scarf cycle at time T39 (FIGURE 2), the main scarfing valve 78j is shifted to a retract position by energizing solenoid S9 (FIGURES 15, 16A, 16B). Then valve 78c3 returns to a deenergized position and the pilot cylinders 78g' shift the upset valves 78f to cause the impact cylinders 72b to retract and the valve 78j to shift to normal center blocked position. The pressure release valve 78v is energized by solenoid S6 (FIGURES 15, 16A, 16B) to block during the scarf cycle (time T38–T39) and is opened at the end of the scarf cycle.

Billet spacing mechanism 51

Referring to FIGURE 15, oil flows through a valve 78x (controlled by solenoid S13), FIGURES 15, 16A, 16B, through speed control valve 78z to one end of the hydraulic fluid cylinder 78y. The oil returns through speed control valve 78z' to the four-way valve 78x.

Electrical control means 80

The electrical control means 80 (FIGURES 16A, 16B) has power lines extending from a suitable power source indicated by the legend "A-C voltage supply" through a manual circuit breaker MC and fuses F5 to reversing motor starter 36g", for the movable carriage 30. Motor 36g' drives the movable carriage 30 in the forward direction. Motor 36g drives the movable carriage 30 in the rearward direction. Transformers 80a, 80b step down the line voltage to the desired control volatge in two-branch operating circuits 80c, 80d. The pump motor 78b is connected directly to the power source through a motor starter 78b'.

Pump start push button PBp1 starts the hydraulic motor 78b through motor starter 78b', coil 78b2 and holding contact 78b2'. Push button PBp2 stops hydraulic pump motor 78b by breaking the holding circuit contact 78b2'.

To facilitate the explanation of the electrical control means 80, reference is made to Table I below, a solenoid valve switch chart for a stepping switch 80e of the electrical control means 80 and to Table II below, a cam chart for the stepping switch 80e of the electrical control means 80.

TABLE I

| Step Switch 80e Position | Input Signal To Advance Step Switch 80e | Solenoid Valve Switches Closed X, Open O | | | | | | System Operation |
|---|---|---|---|---|---|---|---|---|
| | | SA Gas | SB O2 | SC O2 | SD Gas | SE O2 | SF Latch | |
| Home 1 | Push Button PBwc (Start Weld Cycle) | O | O | O | O | O | O | All Valves Closed. |
| Home 2 | Limit Switch LS6 Through Time Delay Relay Contact TD5-1 Closes. | X | X | O | O | O | O | Torch Preheat Gas Solenoid Valve 78q Opens; Torch Preheat O2 Valve 78f Opens. |
| Home 3 | Time Delay Relay Contact TD6-1 Closes | X | X | X | O | O | O | Cutting O2 Solenoid Valve 78 Opens. |
| Home 4 | Limit Switch LS7 Closes | X | X | X | O | O | X | Solenoid Latch Released to Start Burn-off. |
| Home 5 | Limit Switch LS8 Closes | X | X | O | X | O | O | Cutting O2 Solenoid Valve 78i Closes Weld Preheat Gas Solenoid Valve 76q Opens. |
| Home 6 | Timer T1 Times Out Contact 3-1 Closes | O | O | O | X | X | O | Weld Preheat O2 Solenoid Valve 76q Opens; Torch Preheat Gas Solenoid Valve 78g Closes; Torch Preheat O2 Solenoid Valve 76f Closes. |
| Home 7 | Limit Switch LS9 Closes | O | O | O | X | O | O | Oxygen Preheat Solenoid Valve 76c Closes. |
| Home 1 | To Position I (End of Cycle) | O | O | O | O | O | O | Gas Preheat Solenoid Valve 76t Closes. |

TABLE II

| Contacts—O=Open; X=Closed | Steps (Positions) Home | | | | | | |
|---|---|---|---|---|---|---|---|
| | 1 | 2 | 3 | 4 | 5 | 6 | 7 |
| XA-XB (Homing) | O | X | X | X | X | X | X |
| 1A-1B | O | X | O | O | O | O | O |
| 2A-2B | O | O | X | O | O | O | O |
| 3A-3B | O | O | O | X | O | O | O |
| 4A-4B | O | O | O | O | X | O | O |
| 5A-5B | O | O | O | O | O | X | O |
| 6A-6B | O | O | O | O | O | O | X |
| 7A-7B (Torch Gas and O2) | O | X | X | X | X | O | O |
| 8A-8B (Cutting O2) | O | O | X | X | O | O | O |
| 9A-9B (Solenoid Latch) | O | O | O | X | O | O | O |
| 10A-10B (Weld Gas) | O | O | O | O | X | X | X |
| 11A-11B (Weld O2) | O | O | O | O | O | X | O |

*Movable jaw operating circuit*

Closure of a push button PB*mj* (FIGURES 16A, 17) at the time T8 (FIGURE 2) causes energization of the solenoid S1 with resultant operation of the hydraulic valve 78c in the hydraulic control means 78 (FIGURE 15). In addition, relay CR1 (FIGURE 16A) is energized with resultant closure of a normally open holding contact CR1-1 until the end of the scarfing cycle at time T39 (FIGURE 2). A normally closed interlock contact CR7-1 of the relay CR7 remains closed. A manual release push button PB*mr*1 (normally closed) is provided to deenergize the solenoid S1 and relay CR1 and release the holding contact CR1-1. A normally open contact CR4-1 in parallel with the manual release push button PB*mr*1 is closed during the welding cycle and prevents the opening of the movable jaws 68.

*Stationary jaw operating circuit*

At time T8 (FIGURE 2) push button PB*sj* (FIGURES 16A, 17) causes the energization of the solenoid S2 (FIGURE 15) with resultant operation of the hydraulic valve 78c2 and the energization of a relay CR2 and resultant closure of normally open holding contact CR2-1. A normally closed contact CRY-1 of a relay CRY and a normally closed contact CR9-1 of the relay CR9 remain closed except during scarfing cycle as hereinafter described. A normally open contact CR4-2 in parallel with a manual release push button PB*mr*2 (FIGURES 16A, 17) is closed during the welding cycle and prevents opening of the stationary jaws 68. The normally closed contacts CRY-1 and CR9-1 release the holding circuit, deenergize solenoid S2 and open the stationary jaws 66 before the scarfing cycle starts.

*Scarfing die operating circuit*

Provided the limit switch LS4, FIGURE 8, on the return end of frame 70a of the billet heating mechanism 70 is closed by the movable torch carriage 70c in the return position at time T40—T43 (FIGURE 2), the closure of the scarfing die push button PB*sd* (FIGURES 16A, 17) energizes the solenoid S3 to open the valve 78c6 (FIGURE 15) of the hydraulic control means 78 and to energize the relay CR3 with resultant closure of a normally open holding contact CR3-1. A normally closed interlock contact CR2-2 (FIGURE 16A) and a normally open contact CR1-2 must be closed, thus assuring that the stationary jaws 68 are open and the movable jaws 68 are closed during the scarf cycle. Normally closed interlock contact CR7-2 remains closed until the completion of the scarfing cycle at time T39 as hereinafter described, at which time the scarf cutters 74a are automatically opened by cylinders 74b (FIGURE 15).

*Hydraulic unloading circuit*

When normally closed pressure switch PS1 (FIGURES 15, 16A) in the high-pressure pump circuit remains closed, a solenoid S10 (FIGURES 15, 16A) is energized and dump valve DV1 remains closed, thereby charging the high-pressure accumulator 78L to its maximum pressure. When the pressure switch PS1 opens, the solenoid S10 is deenergized and the dump valve DV1 is opened, thus bypassing the pump discharge oil back to the tank 78c1. Low-pressure pump 78a (FIGURE 15) is a variable volume type and delivers only enough oil to meet the system demand at the pre-set pressure. Normally open contact CR8-1 in parallel with the pressure switch PS1 closes during the preheat time T17—T32 to assure maximum hydraulic charge in the accumulator 78L.

So that the dump valve DV1 can be overridden in the event of an electrical failure, a safety relief valve 78R (FIGURE 15) is provided in the high-pressure circuit. In order to indicate actual hydraulic pressure, pressure gauges 78G (FIGURE 15) having manual shut-off valves 78*so* are installed. For the purpose of cooling the hydraulic fluid a water cooled heat exchanger 78H is connected to the pump 78a.

Oscillating motor circuit

The closing of the limit switch LS1 (FIGURES 8, 16A) at the start of the weld heating cycle at time T17 (FIGURE 2) energizes a relay CR8 thereby closing normally open contacts CR8–2 and CR8–3 in the oscillating motor circuit and thus energizing the oscillating mechanism motor 70p. The oscillating motor circuit is deenergized when the switch LS1 is opened by the retraction of the torch carriage 70c to the left, as viewed in FIGURE 8 at the end of the weld heating cycle (T17—T32) (FIGURE 2).

Welding cycle preparation circuit

The closure of a push button PBwc (FIGURES 16A, 17) energizes the solenoid S4 associated with the valve 78c4 in the hydraulic control means 78 (FIGURE 15) and the relay CR4. Normally open interlock contacts CR1–3 and CR2–3 have been previously closed by the closure of both the movable jaws 68 and stationary jaws 66. Normally closed interlock contact CR12–3 remains closed when the billet spacing mechanism 51 is retracted.

Closure of the push button PBwc also closes an associated contact PBwc'' (FIGURE 16B) thus energizing a relay CR5. The solenoid S5 associated with the main valve 78c3 in the hydraulic control means 78 (FIGURE 15) is energized by the closure of a normally open relay contact CR5–1. A holding contact CR5–2 also closes. Normally open interlock relay contacts CR1–4 and CR2–4 have been previously closed by the closure of the movable clamp jaws 68 and the stationary clamp jaws 66, thus allowing the energizing of the impact welding cycle.

Safety Devices

A safety on-off switch PB1c (FIGURE 16B) must be closed to initiate the impact cycle and also serves to allow the trial operation (when it is open) of the welding cycle without the impact cycle when the billets 18,14 are not present. A pilot light 82 (FIGURE 16B) indicates when the impact cycle is "ready." Normally closed push button PBwc1 and associated contacts PBwc1' and PBwc1'' provide for manual interruption of the welding cycle in the event of a malfunction of the welding apparatus 10 and allow the torch carriage 70c to be retracted. A normally closed pressure switch PS2 (FIGURE 16B) in the hydraulic impact circuit permits energizing the impact cycle only when no hydraulic fluid pressure exists prior to closure of PBwc''. Pressure release valve 78v (FIGURE 15) is normally open for this purpose when solenoid S6 (FIGURES 15, 16B) is deenergized. Water pressure switch WPS (FIGURE 16A) remains closed when cooling water is flowing through the cutting torches 70t and the heating torch 70k.

In order to permit check-out of the equipment cycle and to prevent accidental impact when the billets 14, 18 are not present in the apparatus 10, the above-mentioned impact switch PB1c (FIGURE 16B) is provided. Closure of the push button PB1c lights the pilot light 82, thus indicating that the system is ready for impact.

Further, for the purpose of rendering the manual stepping switch 80e inoperative, a two-position selector switch 80SS (FIGURE 17) is provided (FIGURE 16B) having contacts 80SS–1 (FIGURE 16B) which are closed in the automatic position and are open in the manual position. To prevent operation of the blocking valve 78c5 (FIGURE 15) during manual operation, the switch 80SS has a companion set of contacts 80SS–2 (FIGURE 16B) which are closed during manual operation and are open during automatic operation.

Again for set-up purposes and for check-out purposes, a manual push button PBms (FIGURE 16B) is provided for manually operating the stepping switch 80e. So that the stepping switch 80e may be reset, a manual homing push button PBmh is available.

Cutting cycle

The closure of a weld cycle start push button PBwc1 (FIGURES 16A, 16B, 17) energizes the stepping switch 80e (when selector switch 80c is in automatic) in home position 1 (Table II) thus stepping the switch 80e to the position 2, Table II, and thereby energizing the gas valve solenoid SA and the oxygen valve solenoid SB (FIGURES 14, 16B) through closure of contact 7A–7B, position 2, Table II. The valves 76q, 76f are opened by the solenoids SA, SB, respectively, thus supplying preheating gas and oxygen to both cutting torches 70t. A pilot light (not shown) serves to light the torches 70t.

The torch carriage 70c (FIGURES 8, 9) moves forward and trips the limit switch LS6 (FIGURE 8), thus opening contact LS6–1 and closing contacts LS6–2 (FIGURE 16B). The solenoid S11 (FIGURES 15, 16B) is deenergized to close the blocking valve 78c5 (FIGURE 15), thereby stopping the torch carriage 70c with the cutting torches 70t in position at the edge of the billets 18 and 14 for preheat, such billets 18, 14 prior to the start of the billet cutting (T11–T16) (FIGURE 2).

The closing of the normally open limit switch contact LS6–2 (FIGURE 16) energizes a time delay relay TD5. At the end of about 5½ seconds time, a normally open contact TD5–1 closes, thus causing the stepping switch 80e to step to position 3, Table II, through a closed contact 1A–1B of the stepping switch 80e.

Through the closed contact TD5–1 (FIGURE 16B), a time delay relay TD6 is also energized at the same time. The contact 8A–8B (Table II) of the stepping switch 80e energizes the solenoid SC, which solenoid SC (FIGURES 14, 16B) opens the oxygen valve 76i, thereby supplying cutting oxygen to the cutting torches 70t. After about one second the time delay relay TD6 times out, thereby closing normally open contact TD6–1 and causing the stepping switch 80e to advance to position 4 through a closed contact 2A–2B (Table II) of the stepping switch 80e. A solenoid SF (FIGURE 16B) is energized through closed stepping contacts 9A–9B and releases a mechanical positioning latch 85 (FIGURE 9). A relay CRZ is also energized, thus closing normally open contact CRZ–1 and causing energization of the solenoid S11. The solenoid S11 opens the hydraulic blocking valve 78c5 (FIGURE 15), thus allowing the torch carriage 70c to move forward at billet cutting velocity V4.

The limit switch LS7 (FIGURE 8) is actuated by the torch carriage 70c at the end of the time T17 (FIGURE 2), thus closing contact LS7–1 (FIGURE 16B) and causing the stepping switch 80e to step to position 5, Table II, through a closed contact 3A–3B of the stepping switch 80e. The step switch contact 10A–10B (FIGURE 16B) closes, thereby energizing solenoid SD, which solenoid SD opens gas valve 76t (FIGURE 14) to the weld heating torch 70k.

Heating cycle

The closure of the limit switch contact LS8–1 advances the stepping switch 80e through its closed contact 4A–4B to the position 6 of the stepping switch 80e, Table II. The solenoid SE (FIGURE 14) is energized through the closed step contact 11A–11B of the stepping switch 80e and the solenoid SE opens the oxygen valve 76k (FIGURE 14) to the weld heating torch 70k. The torch 70k is lighted by the temperature of the billets 14, 18.

The closure of the limit switch LS1 starts the timer T1 (FIGURE 16A) by energizing a timer clutch coil 86 and energizing a timer motor 88 by closure of the timer contacts L2–B. The timer contact 4–2 (which is closed in the reset position) is also closed in the timing position but such contact 4–2 opens when the timer T1 times out at end of the weld heating time (about 15 seconds at time T32), and interrupts the holding circuit through relay CR4 and opens the closed relay contact CR4–3. This deenergizes the relay CR4, opens contact CR4–3, and deenergizes the solenoid S4 associated with the hydraulic valve 78c4 (FIGURE 15) thus causing retraction of the torch carriage 70c. The timer contact 3–1 closes when the timer T1 times out and through closed contacts 5A–5B of the stepping switch 80e causes stepping switch 80e to step to position 7, Table II, thereby deenergizing solenoid SE and closing the oxygen valve 76k (FIGURE 14) which supplies oxygen to the weld heating torch 70k.

*Impact cycle*

During the fast return travel of the torch carriage 70c, limit switches LS2 and LS9 are closed momentarily. Closing of limit switch contact LS9–1 through closed contacts 6A–6B of the stepping switch 80e causes the stepping switch 80e to step to home position which opens contact 11A–11B and deenergizes solenoid SE and closes gas valve 76 which supplies gas to the weld heating torch 70k. Closure of the limit switch contact LS2–1 starts the timer T2 by energizing a timer clutch 86A and a timer motor 88A. The timer contact 3′–1′ closes during the timing period of the timer T2 and energizes a relay CR6, which relay CR6 closes a normally open contact CR6–1, thereby energizing solenoid S7 associated with pilot hydraulic valve 78m′ (FIGURE 15). The valve 78m′ shifts the main impact valve 78m, thereby causing the impact cycle to occur. When the timer T2 times out, contacts 3′–1′ open, thus deenergizing relay CR6, which relay CR6 opens the relay contact CR6–1 with attendant deenergization of the solenoid S7 and returns the impact hydraulic valve 78m to the closed position. Timer contacts 4′–2′ close, thus energizing the relay CRX and closing the holding contact CRX–1.

The relay contact CRX–2 closes, thereby energizing a relay CR10 and a time delay relay TR4. A relay contact CRX–3 opens to prevent energizing of the scarf solenoid S8 when the contact CR10–4 closes. The relay CR10 and the timing relay TR4 are held energized by the closure of the contact CR10–3. The time delay relay TR4 then times out, thus closing the normally open contact TR4–2 in about 2½ seconds and energizing the scarf return solenoid S9. The solenoid S9 actuates the hydarulic valve 78j (FIGURE 15) and causes the movable jaw carriage 72 to be retracted. The limit switch LS3 at the return end (or the left end, as viewed in FIGURE 8) of the movable jaw carriage 72 opens and deenergizes the solenoid S9 which actuates the hydraulic valve 18j and returns it to the center blocked position and opens the holding contact CR7–4. The relay CR10 and the timing relay TR4 have been deenergized by the opening of the normally closed contact CR7–3 when timing relay TR4 times out.

A normally closed relay contact CR7–1 in the movable jaw circuit and a normally closed relay contact CRY–1 in the stationary jaw circuit open momentarily to cause the clamp jaws 66, 68 to open, thereby completing the impact cycle.

*Scarfing cycle*

If the interlock contacts are closed, namely normally open CR1–5 is closed (indicating the scarfing cutter dies 74a are closed); normally closed contact CR4–4 is closed (indicating the weld cycle is complete); and normally closed contact CR2–5 is closed (indicating the fixed clamp jaws 66 are open), and normally closed contact CR12–4 is closed (indicating the billet spacing mechanism 51 is retracted), then the closure of a push button PBsc (FIGURES 16B, 17), at the time T38–T39 (FIGURE 2) starts the scarfing cycle by energizing the relay CR9 and the time delay relay TR3. A contact CR9–2 is closed to hold the scarfing cycle circuit energized until the normally closed timed contact TR3–2 opens in about 2½ seconds.

A normally open contact CR9–4 also closes, thus energizing the solenoid S5 associated with the hydraulic valve 78c3 (FIGURE 15), thereby causing the pilot cylinders 78g to shift the upset valves 78f (FIGURE 15) in preparation for the forward travel of the movable jaw carriage 72 (FIGURES 3, 5, 6). Normally closed relay contact CR9–1 in the stationary jaw circuit opens which prevents accidental closure of the stationary jaws 66.

When the time delay relay TR3 times out, normally open contact TR3–1 closes after about 2 seconds to energize a relay CR10 and a time delay relay TR4. A normally open contact CR10–3 closes to hold the circuit energized. A normally open contact CR10–1 also closes to maintain the circuit to the solenoid S5 after timing relay TR3 times out and normally closed contact TR3–2 opens. The closed contact CR9–1 opens when the timing relay TR3 and relay CR9 are deenergized.

The closure of a normally open contact CR10–4 energizes the solenoid S8 associated with the 3-position hydraulic valve 78j (FIGURE 15) thus causing hydraulic fluid to pass into the upset cylinders 72b and causing the movable jaw carriage 72 to move forward (to the left as viewed in FIGURE 6), at a preset scarfing velocity V5 as determined by the speed control valves 78j′ (FIGURE 15). The forward travel of the movable jaws 68 forces the welded billet section 18 through the closed scarfing cutter dies 74a, thereby removing the excess weld upset metal on all four sides of the weld.

When the time delay relay TR4 times out a normally open contact TR4–2 closes (for about 2½ seconds), thus energizing the solenoid S9 associated with the 3-position hydraulic valve 78j (FIGURE 15). At the same time a normally closed contact TR4–1 opens to deenergize the solenoid S8 and causes the movable jaw carriage 72 to be retracted. The relays CR7 and CRY are also energized when contact TR4–2 closes. A normally closed contact CR7–3 opens to deenergize relay CR10 and time delay relay TR4 and the contact CR7–1 opens, thus deenergizing solenoid S1 associated with a hydraulic valve 78c1 which opens the movable jaws 68. A normally closed contact CR7–2 opens to deenergize solenoid S3 associated with hydraulic valve 78c6 which causes the scarfing cutter dies 74a to open. The solenoid S5 is deenergized when relay contact CR10–1 opens so that the pilot cylinders 78g′ shift upset valves 78f to the position for the return of the movable jaw carriage 72. The shifting of the 3-position hydraulic valve 78j causes hydraulic fluid to retract the upset cylinders 72b and to return the movable jaw carriage 72 to the right, as viewed in FIGURE 6, and to open the limit switch LS3, thus causing the solenoid S9, the relay CRY and the relay CR7 to be deenergized and thereby completing the scarf cycle. Deenergizing solenoid S9 returns hydraulic valve 78j to its center blocked position (FIGURE 15).

*Motor drive for movable carriage 30*

The closure of a run forward push button PBrf (FIGURE 16) energizes a starter coil FRR, which coil FRR closes the power line contacts FS1, FS2 and FS3, thus energizing the forward movable carriage motor 36g′, which motor 36g′ drives the movable carriage 30 in a forward direction, to the left (FIGURE 3). A normally open holding contact FRR–1 closes to maintain the circuit. A normally open contact FRR–2 closes to energize a forward clutch coil S14 and a normally closed contact FRR–3 opens to prevent the energization of the coil 1F. A stop push button PBs opens the run forward hold circuit through closed contacts FRR–1 and FRR–4, thus deenergizing the coil FRR. The coil FRR opens the contacts FRR–1 and FRR–4 to stop the forward movable carriage motor 36g′.

A forward clutch coil S14 is energized simultaneously with the forward movable carriage motor 36g′ (FIGURES 4, 16A), thus transmitting motor power to the gear reducer 36e, which reducer 36e drives the chain 36d attached to the movable carriage 30 at 36c.

A jog forward push button PBjf (FIGURE 16A) energizes the starter coil 1F, which coil 1F closes the power line contacts FS1, FS2 and FS3 to energize the forward movable carriage motor 36g′ (FIGURES 4, 16A). A forward clutch coil S14 is also energized through a normally closed contact FRR-3 to engage the forward clutch 36f' (FIGURE 4). The release of the jog push button PBjf immediately stops the forward movable carriage motor 36g' and also deenergizes the forward clutch coil S14 which disengages the forward clutch 36f'. The limit switch LS38a (FIGURES 3, 16A) is located at the forward or left end (FIGURE 3) of the carriage travel and automatically stops the carriage 30 at the extreme end of its travel.

Closure of a run reverse push button PBrr (FIGURE 16A) energizes a starter coil RRR, which coil RRR closes the power line contacts RS1, RS2 and RS3, thus energizing the reverse movable carriage motor 36g (FIGURES 4, 16A). This motor 36g drives the movable carriage 30 in a reverse or right direction (FIGURE 3). A holding contact RRR-2 closes to energize the coil S15 of the reverse clutch 36f (FIGURE 4). A normally closed contact RRR-3 opens to prevent the energizing of the coil 1F.

A stop push button PBs (FIGURE 16A) opens the run forward and run reverse hold circuits through closed contacts FRR-1 and FRR-4, RRR-1 and RRR-4 respectively, and to stop the movable carriage motor 36g or 36g' whichever is operating at the time.

The reverse clutch coil S15 is energized simultaneously with the reverse movable carriage motor 36g, thus transmitting motor power to the gear reducer 36e (FIGURE 4), which reducer 36e drives the chain 36d attached to the movable carriage 30.

Billet spacing mechanism

The closure of a push button PBe (FIGURE 16B) causes the energization of a solenoid S13 with resultant operation of the hydraulic valve 78x in the hydraulic control means 78 (FIGURE 15). The hydraulic cylinder 78y is extended. Relay CR12 is energized with the resultant closure of a normally open holding contact CR12-1.

The normally closed interlock contacts CR4-5, CR9-4 and CR3-3 prevent operation of the billet spacer 58 unless the weld cycle is deenergized, the scarf cycle is deenergized and the scarfing cutter dies 74a respectively are retracted.

The closure of a retract push button PBr opens the holding circuit through the closed contact CR12-1, the relay CR12 is deenergized and the solenoid S13 is deenergized, thereby reversing the operation of hydraulic valve 78x and causing the retraction of the hydraulic cylinder 78y (FIGURE 15) which is attached to the billet spacing mechanism 51 (FIGURE 5) and is controlled by the operator.

Summary of the achievement of the objects of the invention

It will be recognized by those skilled in the art that the objects of this invention have been achieved by providing an apparatus for impact welding a billet to a continuous billet, which impact welding apparatus substantially increases rolling mill production, produces rolled finished product with acceptable tolerances, substantially eliminates cobbling, and substantially eliminates the loss of stretch reduction tension between mill stands, resultant overfill of the roll pass and attendant trimming of defective end portions from the finished rolled product.

While in accordance with the patent statutes, preferred and alternative embodiments of this invention have been illustrated and described in detail, it is to be particularly understood that the invention is not limited thereto or thereby.

I claim:
1. Apparatus for impact welding the end of a billet to an adjacent end of a continuous billet while said continuous billet is being processed through a first work station, said apparatus having:
   (a) a movable carriage movable between a billet receiving position and said first work station at a variable first velocity initially greater than the velocity of said continuous billet as it moves through said first work station, and movable between said first work station and said billet receiving position at a second velocity greater than said first velocity,
   (b) a billet spacing mechanism on said movable carriage and adapted to engage said adjacent end of the continuous billet while said movable carriage is moving toward said first work station,
   (c) a billet feeding mechanism adjacent said billet receiving position for positioning said end of the billet against said billet spacing mechanism and spacing said end of the billet a predetermined distance from said adjacent end of the continuous billet,
   (d) a billet clamping and impacting mechanism on said movable carriage and having a pair of stationary jaws adapted to grip said adjacent end of the continuous billet and a pair of movable jaws adapted to grip said end of the billet when said end of the billet is spaced said predetermined distance from said adjacent end of the continuous billet so that said movable carriage moves with said continuous billet,
      (1) said billet spacing mechanism being operable to retract away from said gripped adjacent end of the continuous billet and said gripped end of the billet,
   (e) a heating mechanism on said movable carriage movable between said gripped adjacent end of the continuous billet and said gripped end of the billet for heating said gripped adjacent end of the continuous billet and said gripped end of the billet to a temperature slightly below the melting temperature of said billet and said continuous billet,
      (1) said movable jaws being operable to impact said heated end of the billet against said heated adjacent end of the continuous billet to weld and to hold said end of the billet to said adjacent end of the continuous billet.

2. For apparatus for impact welding the end of a billet moving toward an adjacent end of a continuous billet while said continuous billet is being processed through a first work station, in combination:
   (a) a movable carriage movable between a billet receiving position and said first work station at a variable first velocity initially greater than the velocity of said continuous billet as it moves through said first work station and movable between said first work station and movable between said first work station and said billet receiving position at a second velocity greater than said first velocity, and
   (b) a billet spacing mechanism on said movable carriage for spacing said end of the billet a predetermined distance from said adjacent end of the continuous billet and adapted to engage said adjacent end of the continuous billet while said movable carriage is moving toward said first work station and to be engaged by said end of the billet,
      (1) said billet spacing mechanism being operable to retract away from said adjacent end of the continuous billet and said end of the billet.

3. For apparatus for impact welding the end of a billet to an adjacent end of a continuous billet while said continuous billet is being processed through a first work station, in combination:
   (a) a movable carriage movable between a billet receiving position and said first work station at a variable first velocity initially greater than the velocity of said continuous billet as it moves through said first work station and movable between said first work station and said billet receiving position at a second velocity greater than said first velocity, and
   (b) a billet feeding mechanism adjacent said billet receiving position for positioning said end of the billet adjacent to said adjacent end of the continuous billet.

4. For apparatus for impact welding the end of a billet to an adjacent end of a continuous billet while said continuous billet is being processed through a first work station, in combination:
(a) a movable carriage movable between a billet receiving position and said first work station at a variable first velocity initially greater than the velocity of said continuous billet as it moves through said first work station and movable between said first work station and said billet receiving position at a second velocity greater than said first velocity, and
(b) a billet clamping and impacting mechanism on said movable carriage and having a pair of stationary jaws adapted to grip said adjacent end of the continuous billet and a pair of movable jaws adapted to grip said end of the billet when said end of the billet is spaced a predetermined distance from said adjacent end of the continuous billet so that said movable carriage moves with said continuous billet,
(1) said movable jaws being operable to impact said heated end of the billet against said heated adjacent end of the continuous billet to weld and hold said end of the billet to said adjacent end of the continuous billet.

5. For apparatus for impact welding the end of a billet to an adjacent end of a continuous billet while said continuous billet is being processed through a first work station, in combination:
(a) a movable carriage movable between a billet receiving position and said first work station at a variable first velocity initially greater than the velocity of said continuous billet as it moves through said first work station and movable between said first work station and said billet receiving position at a second velocity greater than said first velocity, and
(b) a heating mechanism on said movable carriage movable between said adjacent end of the continuous billet and said end of the billet disposed in spaced relation to said adjacent end of the continuous billet for heating said adjacent end of the continuous billet and said end of the billet to a temperature slightly below the melting temperature of said billet and said continuous billet.

6. Apparatus for impact welding the end of a billet to an adjacent end of a continuous billet while said continuous billet is being processed through a first work station, said apparatus having:
(a) a movable carriage movable between a billet receiving position and said first work station at a variable first velocity initially greater than the velocity of said continuous billet as it moves through said first work station, and movable between said first work station and said billet receiving position at a second velocity greater than said first velocity,
(b) a billet feeding mechanism adjacent said billet receiving position for positioning said end of the billet against said adjacent end of the continuous billet,
(c) a billet clamping and impacting mechanism on said movable carriage and having a pair of stationary jaws adapted to grip said adjacent end of the continuous billet and a pair of movable jaws adapted to grip said end of the billet so that said movable carriage moves with said continuous billet,
(d) a heating mechanism on said movable carriage movable between said gripped adjacent end of the continuous billet and said gripped end of the billet for heating said gripped adjacent end of the continuous billet and said gripped end of the billet to remove a slug from said gripped adjacent end of the continuous billet and said gripped end of the billet and for heating said gripped adjacent end of the continuous billet and said gripped end of the billet to a temperature slightly below the melting temperature of said billet and said continuous billet,
(1) said movable jaws being operable to impact said heated end of the billet against said heated adjacent end of the continuous billet to weld and hold said end of the billet to said adjacent end of the continuous billet.

7. The apparatus recited in claim 1 wherein said apparatus has a scarfing mechanism on said movable carriage for removing the flashing from said weld.

8. The apparatus recited in claim 1 wherein said heating mechanism has cutting means for cutting a slug from said end of the billet and said adjacent end of the continuous billet.

9. The apparatus recited in claim 1 wherein said billet spacing mechanism and said billet heating mechanism are slidable together on said movable carriage.

10. The apparatus recited in claim 1 wherein said movable carriage has a frame and an upper frame slidable on said frame.

11. Apparatus for impact welding the end of a first billet to an adjacent end of a second billet while said second billet is being processed through a first work station, said apparatus having:
(a) a frame,
(b) a billet feeding mechanism on said frame for positioning said end of the first billet against said adjacent end of the second billet,
(c) a billet clamping and impacting mechanism on said frame and having a pair of stationary jaws adapted to grip said adjacent end of the second billet and a pair of movable jaws adapted to grip said end of the first billet,
(d) a heating mechanism on said frame movable between said gripped adjacent end of the second billet and said gripped end of the first billet for heating said gripped adjacent end of the second billet and said gripped end of the first billet to remove a slug from said gripped adjacent end of the second billet and said gripped end of the first billet and for heating said gripped adjacent end of the second billet and said gripped end of the first billet to a temperature slightly below the melting temperature of said first billet and said second billet,
(1) said movable jaws being operable to impact said heated end of the first billet against said heated adjacent end of the second billet to weld and hold said end of the first billet to said adjacent end of the second billet.

References Cited
UNITED STATES PATENTS

| 3,190,525 | 6/1965 | Foley et al. | 228—5 |
| 3,386,640 | 6/1968 | Booker | 228—5 |
| 1,436,062 | 11/1922 | Sussman | 228—24 |

RICHARD H. EANES, JR., *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,441,190                                                                  April 29, 1969

Albert L. Stoeckel

It is certified that error appears in the above identified patent and that said Letters Patent are hereby corrected as shown below:

Column 1, line 40, "Sept. 24, 1934" should read -- Sept. 24, 1935 --. Column 4, line 20, "FIGURES 3, 16)" should read -- (FIGURES 3, 16) --; line 37, "cold billets 1" should read -- cold billets 14 --; line 58, "operatable" should read -- operable --. Column 5, line 69, "FIG" should read -- (FIG --. Column 8, line 58, "solenoid S4" should read -- solenoid S4) --. Column 9, line 10, "present time" should read -- preheat time --. Column 10, line 62, "volatge" should read -- voltage --. Column 12, line 37, "turn end of frame" should read -- turn end of the frame --. Column 13, line 43, "malunction" should read -- malfunction --. Column 15, line 40, "hydarulic" should read -- hydraulic --.

Signed and sealed this 14th day of April 1970.

(SEAL)

Attest:

Edward M. Fletcher, Jr.                                WILLIAM E. SCHUYLER, JR.

Attesting Officer                                                  Commissioner of Patents